United States Patent [19]

Zammert

[11] 4,345,138
[45] Aug. 17, 1982

[54] PROCESS OF SHAPING THE RIM OF A COMBUSTION CHAMBER RECESS OF A LIGHT-ALLOY PISTON

[75] Inventor: Wolf U. Zammert, Neckarsulm, Fed. Rep. of Germany

[73] Assignee: Karl Schmidt GmbH, Neckarsulm, Fed. Rep. of Germany

[21] Appl. No.: 210,116

[22] Filed: Nov. 24, 1980

[30] Foreign Application Priority Data

Nov. 29, 1979 [DE] Fed. Rep. of Germany ....... 2948057

[51] Int. Cl.³ .............................................. B23K 27/00
[52] U.S. Cl. ......................... 219/121 LF; 219/121 EG
[58] Field of Search ................... 219/121 LE, 121 LF, 219/121 LW, 121 LY, 121 L, 121 LM, 121 EF, 121 EG, 121 EV, 121 EX, 121 EB, 121 EM

[56] References Cited

U.S. PATENT DOCUMENTS

| | | | |
|---|---|---|---|
| 3,411,380 | 11/1968 | Ehl et al. | 148/39 X |
| 3,711,908 | 1/1973 | Broers | 219/121 LF X |
| 3,773,565 | 11/1973 | Pye et al. | 148/4 X |
| 3,802,927 | 4/1974 | Gomada | 148/4 |
| 4,122,240 | 10/1978 | Banas et al. | 219/121 EG X |
| 4,157,923 | 1/1979 | Yen et al. | 148/4 |
| 4,159,686 | 7/1979 | Heim | 219/121 LF X |
| 4,244,751 | 1/1981 | Hioki et al. | 148/1 |
| 4,250,372 | 2/1981 | Tani | 219/121 EG X |

FOREIGN PATENT DOCUMENTS 2124595 11/1972 Fed. Rep. of Germany .
2507899 6/1980 Fed. Rep. of Germany .

OTHER PUBLICATIONS

Motortechnische Zeitschrift 40(1979) pp. 261 to 266 (Germany).

*Primary Examiner*—C. L. Albritton
*Attorney, Agent, or Firm*—Sprung, Horn, Kramer & Woods

[57] ABSTRACT

An improved process for shaping the edge of a combustion chamber recess in the piston head of a finish-machined light-alloy piston is disclosed wherein the piston is moved past the oscillating charged carrier beam at an angle of inclination of 40° to 50°, the charged carrier beam is caused to act on that portion of the rim of the combustion chamber recess which is to be refined by being remelted and the charged carrier rays are moved over said portion only once. The process presents the formation of cracks at the edge of the chamber.

7 Claims, 2 Drawing Figures

PROCESS OF SHAPING THE RIM OF A COMBUSTION CHAMBER RECESS OF A LIGHT-ALLOY PISTON

BACKGROUND OF THE INVENTION

1. Field of the Invention

This invention relates to a process of shaping the edge of a combustion chamber recess in the piston head of a finish-machined light-alloy piston.

2. Discussion of Prior Art

Thermally induced cracks at right angles to the rim of the combustion chamber recess may form in light-alloy pistons having a combustion chamber recess in the piston head when the piston material is subjected to a stress in excess of its highest permissible stress.

Various measures can be adopted to avoid such cracks. For instance, it is known to provide the piston adjacent to the rim of the combustion chamber recess with inserts made of heat-resistant steel or of cermets. But these measures have the disadvantage of appreciably adding to the weight of the piston. Additionally, the material of the inserts has a relatively poor thermal conductivity and a different coefficient of expansion so that the surrounding light alloy may suffer damage due to heat. The same disadvantages are inherent in inserts made from more ductile materials which are secured adjacent to the rim of the recess by electron beam welding or friction welding. Much better results can be obtained by a partial anodizing of the piston head and of the rim portion of the combustion chamber recess (German Pat. No. 2,507,899).

German Offenlegungsschrift No. 2,154,595 describes a process in which the piston blank is made to have a machining allowance adjacent to the rim of the combustion chamber recess and a zone which is disposed outside the portion added for the machining allowance, adjacent to the subsequently formed rim of the combustion chamber recess, is refined in that it is remelted by means of a charge carrier beam. The portion added for the machining allowance is then removed to expose the remelted zone. The remelting by means of a charge carrier beam results in a melting of a relatively small quantity of material close to the beam and that material solidifies as soon as the charge carrier beam has been removed. This step results in a fine-grained structure, which is relatively strong and has a large elongation.

It is known from "Motortechnische Zeitschrift" 40(1979) pages 261 to 266, particularly page 164, that good results have been obtained sometimes and no improvement has been obtained in other cases with such piston having a combustion chamber recess remelted by means of a charge carrier beam so that the risk of cracks forming at the rim of the combustion chamber recess cannot be avoided with absolute safety.

For this reason it is an object of the present invention reliably to prevent the formation of thermally induced cracks adjacent to the rim of the combustion chamber recess of a light-alloy piston of the kind described first hereinbefore.

SUMMARY OF THE INVENTION

This is accomplished in accordance with the invention in that the piston is moved past the oscillating charge carrier beam at an angle of inclination of 40 to 50 degrees, preferably 45 degrees, the charge carrier beam is caused to act on that portion of the rim of the combustion chamber recess which is to be refined by being remelted, and the charge carrier ray is moved over said portion only once.

In addition, the speed and the frequency of the remelting beam are selected so that the remelting speed is 20 to 50 mm/second, preferably 25 to 35 mm/second, and the frequency amounts to 500 to 900 Hz, preferably 750 Hz.

The depth of the remelted zone should be at least 1 mm and should not exceed 3 mm.

The process according to the invention can be applied to special advantage to light-alloy piston.

Special advantages are afforded by the application of the process according to the invention to light-alloy pistons for diesel engines, which pistons have a combustion chamber recess in a piston head covered by a hard anodized layer except in those portions of the combustion chamber recess which register with the piston pins.

BRIEF DESCRIPTION OF DRAWINGS

The invention is shown by way of example on the drawing and will be explained more fully hereinafter by reference to the drawings in which.

DESCRIPTION OF SPECIFIC EMBODIMENT

Figure 1:
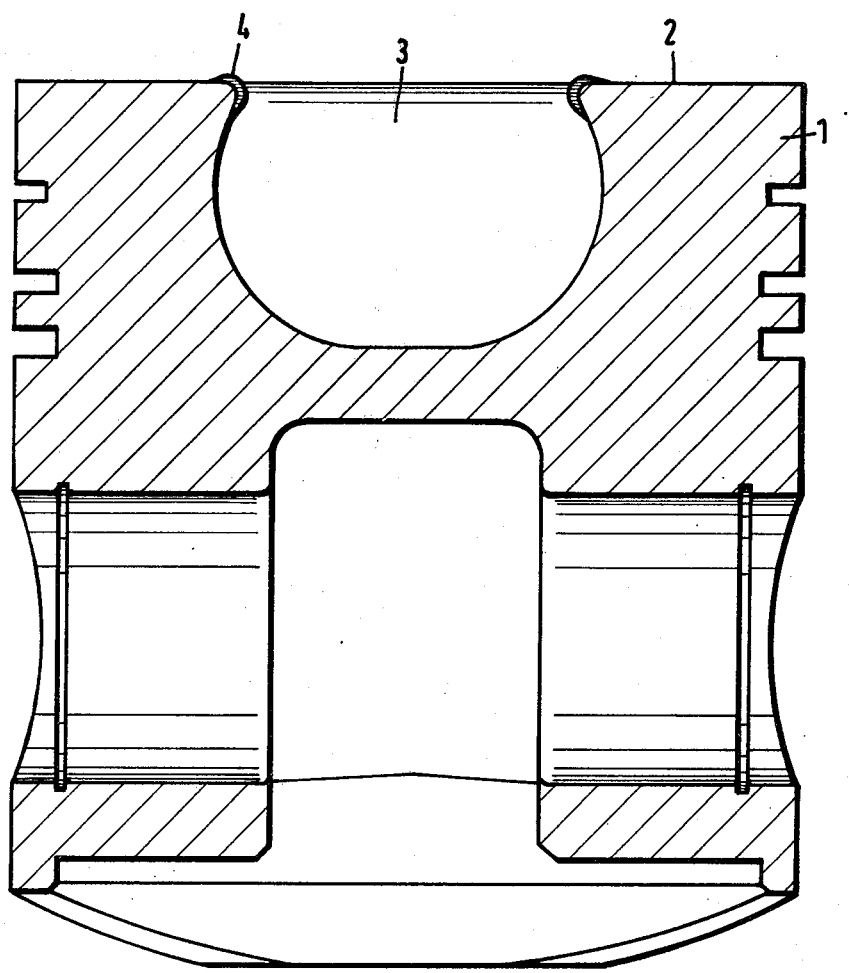
FIG. 1 is a longitudinal sectional view of a piston equipped with a recessed combustion chamber.

The finish-machined light-alloy piston 1 is formed in its piston head 2 with a combustion chamber recess 3 and adjacent to the rim of said recess has been refined to a depth of 2 mm by means of an electron beam. The piston was inclined to the electron beam at an angle of 45°; the remelting speed was 30 mm/second and the frequency of the electron beam was 750 Hz.

Figure 2:
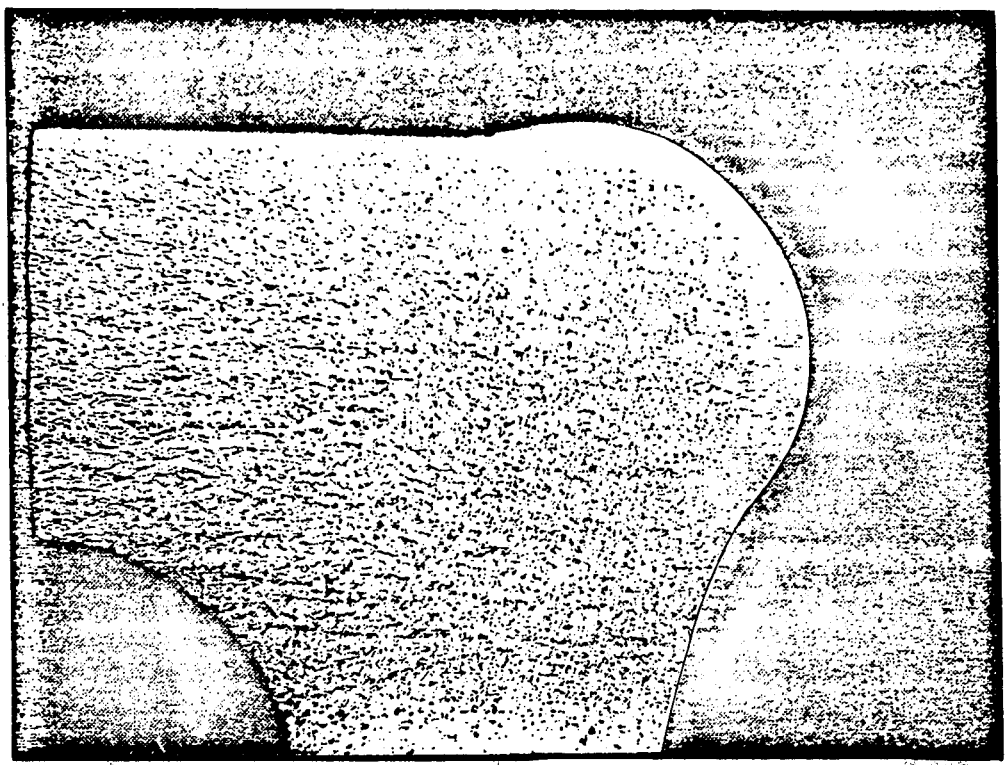
FIG. 2 is a micrograph taken from the rim of the combustion chamber recess of a piston treated in accordance with the invention.

The micrograph of FIG. 2 shows very clearly that the remelting adjacent to the rim of the combustion chamber recess has resulted in a very fine structure compared with the cast structure of the remaining piston.

The advantages afforded by the process according to the invention reside in that the formation of cracks at the rim of the recess is entirely suppressed because the resistance to cyclic changes of temperature has been increased by the remelting of the rim of the combustion chamber recess.

The process of the invention can be performed without providing for material for a machining allowance and without removing material following the remelting.

What is claimed is:

1. In a process of shaping the edge of a combustion chamber recess in the piston head of a finish-machined light-alloy piston by applying an oscillating charged carrier beam to the edge of said combustion zone to remelt the same, the improvement wherein, after said piston is machine finished, applying an oscillating charged carrier beam to the edge of said recess such that said oscillating charged carrier beam forms an angle of inclination with said edge of 40° to 50°, causing said charged carrier beam to act on that portion of the rim of the combustion chamber recess to remelt the same, the rays of said charged carrier beam being applied to said edge portion only once.

2. A process according to claim 1, wherein the angle of inclination is 45°.

3. A process according to claim 1, wherein the remelting speed is 20 to 50 mm per second and the frequency of the charged beam is 500 to 9,000 Hz.

4. A process according to claim 1, wherein the remelting speed is 25 to 35 mm/second and the frequency of the charged carrier beam is 500 to 900 Hz.

5. A process according to claim 1, wherein the frequency of the charged carrier beam is about 750 Hz.

6. A process according to claim 1, wherein the depth of penetration of the charged carrier beam is 1 to 3 mm.

7. A process according to claim 1, wherein the light-alloy piston is a diesel engine light-alloy piston which piston has a combustion chamber recess in a piston head covered by a hard anodized layer except in those portions of the combustion chamber recess which register with piston pins.

* * * * *